United States Patent [19]

Baba

[11] Patent Number: 5,260,923
[45] Date of Patent: Nov. 9, 1993

[54] OPTICAL INFORMATION PROCESSING APPARATUS IN WHICH AN OPTICAL HEAD IS MOVED IN ACCORDANCE WITH A LENS POSITIONAL SIGNAL ELIMINATING AN ECCENTRIC COMPONENT THEREFROM

[75] Inventor: Hisatoshi Baba, Yokohama, Japan

[73] Assignee: Canon Kabushiki Kaisha, Tokyo, Japan

[21] Appl. No.: 33,976

[22] Filed: Mar. 19, 1993

Related U.S. Application Data

[63] Continuation of Ser. No. 314,140, Feb. 23, 1989, abandoned.

[30] Foreign Application Priority Data

Feb. 29, 1988 [JP] Japan .................................. 63-44221

[51] Int. Cl.$^5$ .............................................. G11B 7/085
[52] U.S. Cl. ................................ 369/44.28; 369/44.32; 369/54
[58] Field of Search ............... 369/44.21, 44.32, 43, 369/44.25, 44.34, 44.22, 44.28, 44.29, 32, 44.11, 111, 44.24, 33, 54; 360/77.01, 78.05, 77.02, 77.04; 358/907

[56] References Cited

U.S. PATENT DOCUMENTS

| | | |
|---|---|---|
| 4,410,969 | 10/1983 | Maeda . |
| 4,627,039 | 12/1986 | Meyer . |
| 4,907,214 | 3/1990 | Nagano et al. .......................... 369/32 |
| 4,942,563 | 7/1990 | Yamamuro ..................... 369/44.21 X |
| 4,985,882 | 1/1991 | Tanaka et al. ..................... 369/44.34 |

FOREIGN PATENT DOCUMENTS

55-153138 11/1980 Japan .

Primary Examiner—W. R. Young
Attorney, Agent, or Firm—Fitzpatrick, Cella, Harper & Scinto

[57] ABSTRACT

An apparatus is disclosed in which a recording medium on which tracks are concentrically or spirally formed is rotated and the tracks are scanned by a light beam to thereby accomplish recording and/or reproduction of information. The apparatus includes an optical system for applying the light beam to the medium, a first actuator for driving at least a portion of the optical system to move the light beam in a direction across the tracks, a first detector for detecting any positional deviation between the light beam and the tracks, a first control circuit for controlling the first actuator in accordance with the output of the first detector, an optical head carrying the optical system and the first actuator thereon, a second actuator for moving the optical head in the direction across the tracks, a second detector for detecting the position of the moved portion of the optical system relative to the optical head, and a second control circuit for controlling the second actuator in accordance with a signal in which the eccentric component of the medium is eliminated from the output of the second detector.

7 Claims, 5 Drawing Sheets

DRIVING WAVEFORM
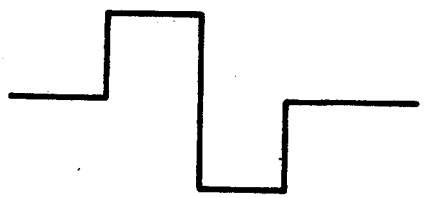
F I G. 7
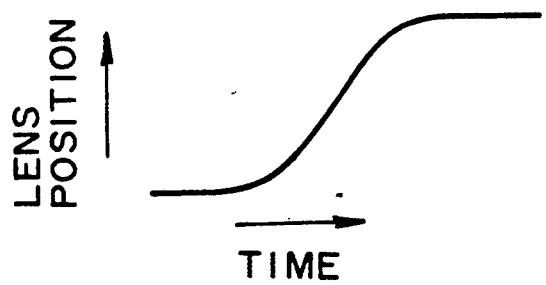
F I G. 8

OPTICAL INFORMATION PROCESSING APPARATUS IN WHICH AN OPTICAL HEAD IS MOVED IN ACCORDANCE WITH A LENS POSITIONAL SIGNAL ELIMINATING AN ECCENTRIC COMPONENT THEREFROM

This application is a continuation of prior application, Ser. No. 07/314,140 filed Feb. 23, 1989, now abandoned.

Optical Information Processing Apparatus in Which an Optical Head Is Moved in Accordance with a Lens Positional Signal Eliminating an Eccentric Component Therefrom.

BACKGROUND OF THE INVENTION

1. Field of the Invention

This invention relates to an optical information processing apparatus, such as an optical disc apparatus, in which a recording medium on which tracks are concentrically or spirally formed is rotated the tracks are scanned by a light beam to thereby accomplish recording and/or reproduction of information.

2. Related Background Art

Heretofore, an optical disc apparatus has assumed a construction such as shown in FIG. 1 of the accompanying drawings. Here, information tracks are concentrically or spirally arranged on a disc 1 which is an information carrier. This disc 1 is rotated by a motor 2, and a light beam 4 is applied from an optical head 3 to the disc 1 to thereby accomplish recording or reproduction of information. The optical head 3 is supported for movement in the radial direction of the disc 1 by a guide rail 10, and is driven by a linear motor comprising a coil 8a and a magnet 8b.

The optical head 3 is constructed as shown, for example, in FIG. 2 of the accompanying drawings. A semiconductor laser 16 is provided in the optical head 3. A light beam emitted from the semiconductor laser 16 passes through a collimator lens 17 and a beam splitter 18 and is condensed on the optical disc 1 by an objective lens 5. The light reflected by the optical disc 1 again passes through the objective lens 5 and is reflected by the beam splitter 18. This reflected light is condensed by a sensor lens 19 comprising a rotation-symmetrical lens and a cylindrical lens, and is received by a four-division detector 20. The four-division detector 20 detects a tracking error signal and a focusing error signal by a method as described in U.S. Pat. No. 4,410,969. The detected tracking error signal is put to a tracking actuator 22 through a tracking control circuit 21. The tracking actuator moves the objective lens 5 in a direction perpendicular to the optical axis and crossing the tracks (the racking direction) in accordance with the signal, and controls the light beam so as to accurately trace the tracks. On the other hand, the objective lens is moved in the direction of the optical axis by a mechanism, not shown, in accordance with the focusing error signal, whereby auto-focusing is accomplished.

However, there is a limit to the range of movement of the objective lens by the tracking actuator. Also, the center of the objective lens greatly deviates relative to the center of the light beam from the semiconductor laser, the imaging performance is deteriorated. Therefore, in U.S. Pat. No. 4,627,039, as shown in FIG. 3 of the accompanying drawings, the position of the objective lens in the tracking direction relative to the base 3a of the optical head is detected by a lens position sensor 6. The detected lens positional signal is input to the linear motor coil 8a through a compensatory controller 7 shown in FIG. 1 which comprises a control stabilizer, a driving amplifier, etc. By such a construction, the optical head 3 follows the movement of the objective lens 5 and moves in the direction across the tracks, whereby the great deviation of the objective lens as mentioned above is prevented. For example, when tracks are spirally formed on the disc 1, the objective lens 5 gradually moves in one direction while tracing the tracks. Following this movement of the objective lens 5, the optical head 3 also moves in the same direction.

However, in the apparatus of the above-mentioned U.S. Pat. No. 4,627,039, the optical head 3 also follows the movement of the objective lens attributable to the eccentricity of the disc 1. This eccentric component is within the tolerance of the tracking servo and does not affect the deterioration or the like of the imaging performance. Accordingly, it is originally unnecessary that the optical head follow such an eccentric component. Thus, in the apparatus according to the prior art, power consumption has been great, because the optical head effects wasteful movement. Also, depending on the control band set, movement of the optical head has resulted in increased eccentric disturbance to tracking servo.

SUMMARY OF THE INVENTION

It is an object of the present invention to solve the above-noted problems peculiar to the prior art and to provide an optical information processing apparatus which is capable of effecting stable tracking servo with little power consumption.

The above object of the present invention is achieved by an apparatus in which a recording medium on which tracks are concentrically or spirally formed is rotated and the tracks are scanned by a light beam to thereby accomplish recording and/or reproduction of information. The apparatus includes an optical system for applying the light beam to the medium;

a first actuator for driving at least a portion of said optical system to move the light beam in a direction across the tracks;

a first detector for detecting any positional deviation between the light beam and the tracks;

a first control circuit for controlling said first actuator in accordance with the output of said first detector;

an optical head carrying said optical system and said first actuator thereon;

a second actuator for moving said optical head in the direction across the tracks;

a second detector for detecting the position of the moved portion of said optical system relative to said optical head; and a second control circuit for controlling said second actuator in accordance with a signal in which the eccentric component of the medium is eliminated from the output of said second detector.

BRIEF DESCRIPTION OF THE DRAWINGS

FIG. 7 shows the waveform of a signal applied to an actuator during track jump.

FIG. 8 shows a change in the lens position with time.

DESCRIPTION OF THE PREFERRED EMBODIMENTS

Figure 1:
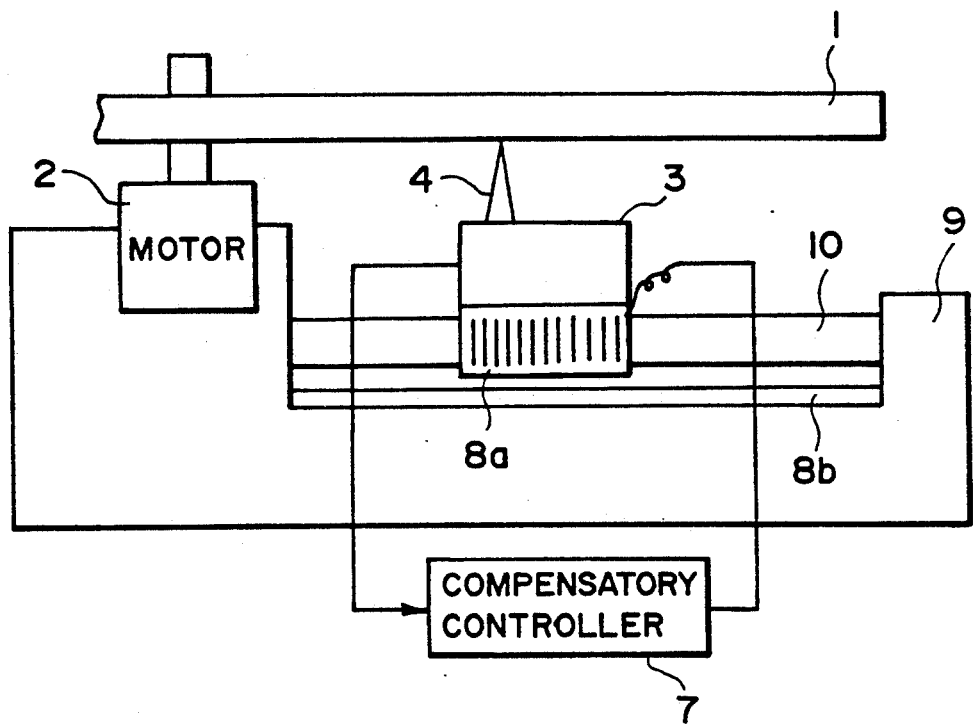
FIG. 1 is a schematic view showing an example of the construction of an optical disc apparatus according to the prior art.
Figure 2:
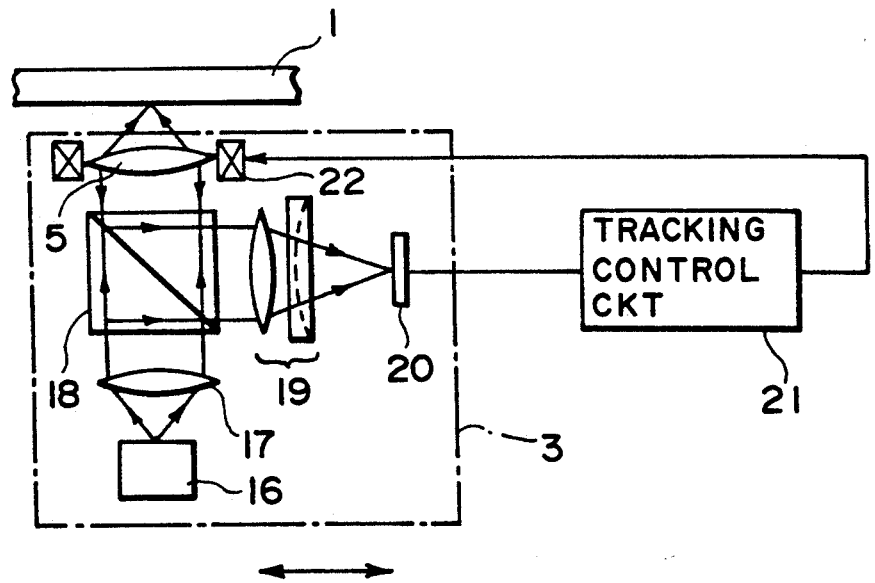
FIG. 2 is a schematic view showing the construction of an optical head used in the optical disc apparatus according to the prior art.
Figure 3:
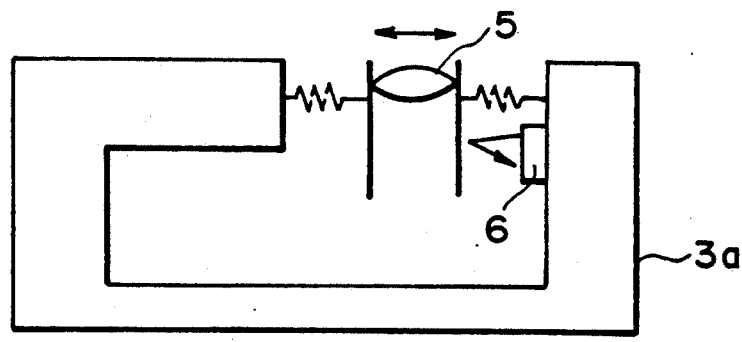
FIG. 3 is a schematic view showing a lens position sensor used in the optical disc apparatus.
Figure 4:
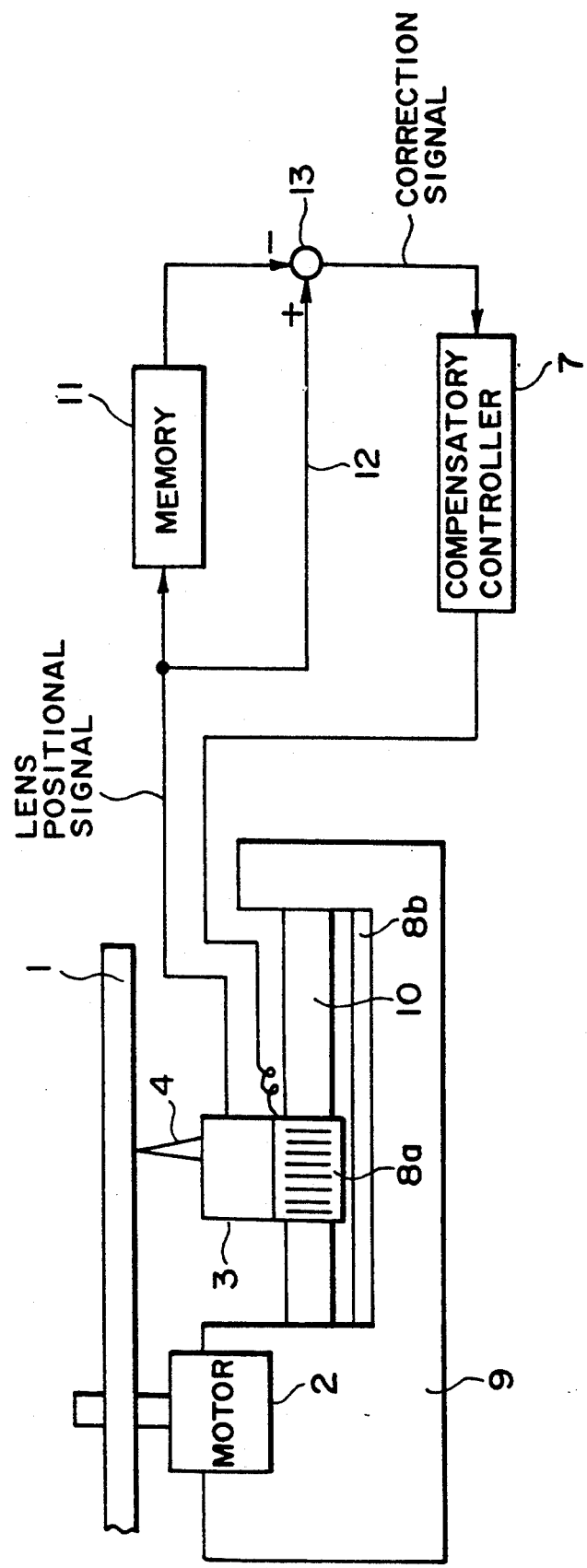
FIG. 4 is a schematic diagram showing an embodiment of the optical disc apparatus of the present invention.

FIG. 4 is a schematic diagram showing an embodiment of an optical disc apparatus to which the present invention is applied. In FIG. 4, members similar to those in FIG. 1 are given similar reference characters. Also, the interior of the optical head 3 is constructed similar to that shown in FIGS. 2 and 3.

A motor 2 is fixed to the base bed 9 of the optical disc apparatus, and a disc 1 on which information tracks are concentrically or spirally arranged is shaft-connected to the motor 2. A guide rail 10 extends under the disc 1, radially with respect to the disc, and the optical head 3 is slidable on the guide rail 10. Moving means for moving the optical head 3 is a linear motor. The linear motor is comprised of a linear motor coil 8a secured to the optical head 3, and a linear motor magnet 8b disposed parallel to the guide rail 10 to cause the linear motor coil 8a to generate a thrust.

The rough structure of the interior of the optical head 3 is similar to that of FIG. 3. That is, an objective lens 5 is movably disposed in vertical and horizontal directions, and a light beam 4 generated in the optical head 3 is condensed on the disc 1 by the objective lens 5. Focusing servo is effected by the objective lens 5 being moved in the vertical direction, and tracking servo is effected by the objective lens 5 being moved in the horizontal direction. A lens position sensor 6 is provided on the optical head 3 so as to be capable of detecting the position of the objective lens 5 in the tracking direction.

The lens positional signal detected by the lens position sensor 6 comprises input to a memory 11 which is storage means.

The information stored by the memory 11 is required to be the deviation between the center of rotation of the disc 1 and the central point of the tracks, i.e., an eccentric component, and therefore, reduction of direct current and elimination of other disturbance is effected by the processing of a microcomputer, or the like, not shown.

Subsequently, the information stored in the memory 11 is differenced with real time information 12 from the lens position sensor 6 at a combining point 13, and is input to a compensatory controller 7. This signal is imparted to the linear motor coil 8a to move the optical head 3.

The operation of the present embodiment constructed as described above will now be described.

Figure 5:
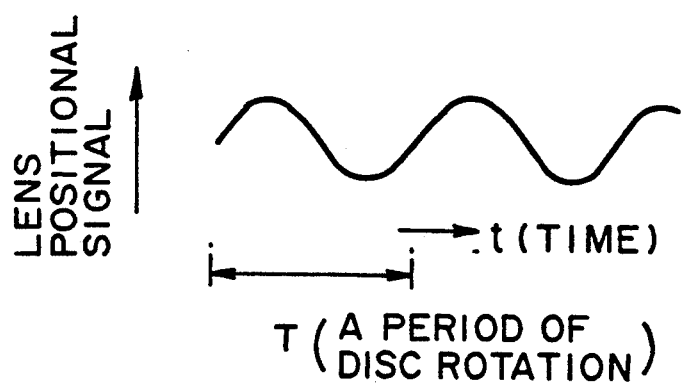
FIG. 5 shows the waveform of a lens positional signal.

The disc 1 is rotated by the motor 2 and the aforementioned focusing servo and tracking servo are applied. At this time, the lens positional signal detected by the lens position sensor 6 assumes a waveform as shown in FIG. 5. That is, this signal becomes a substantially sine wave synchronized with the period of rotation of the disc, due to the eccentricity between the center of rotation of the disc 1 and the central point of the concentric or spiral tracks.

From this lens positional signal, reduction of direct current, elimination of other disturbance, etc. are effected by the processing of the microcomputer or the like, and the eccentric component of the disc 1 is extracted and stored into the memory 11.

Subsequently, at the combining point 13, the information stored in the memory 11 is combined with the real time lens positional signal 12 based on the tracking servo of the objective lens 5 which is detected by the lens position sensor 6, and the difference therebetween is taken and that information is input to the compensatory controller 7. Here, a correction signal which is the combined signal of the output of the memory 11 and the lens positional signal becomes a signal which does not contain the eccentric component of the disc 1.

Then, this correction signal is imparted from the compensatory controller 7 to the linear motor coil 8a to thereby move the optical head 3.

As described above, the correction signal input to the compensatory controller 7 becomes a signal which does not contain the eccentric component of the disc 1 and therefore, even if the gain of this control system is increased, an ineffective drive force due to the eccentric component need not be generated. Thus, power consumption can be reduced. Also, no mutual interference occurs between the tracking actuator and the linear motor and therefore, a stable control system can be constructed.

Figure 6:
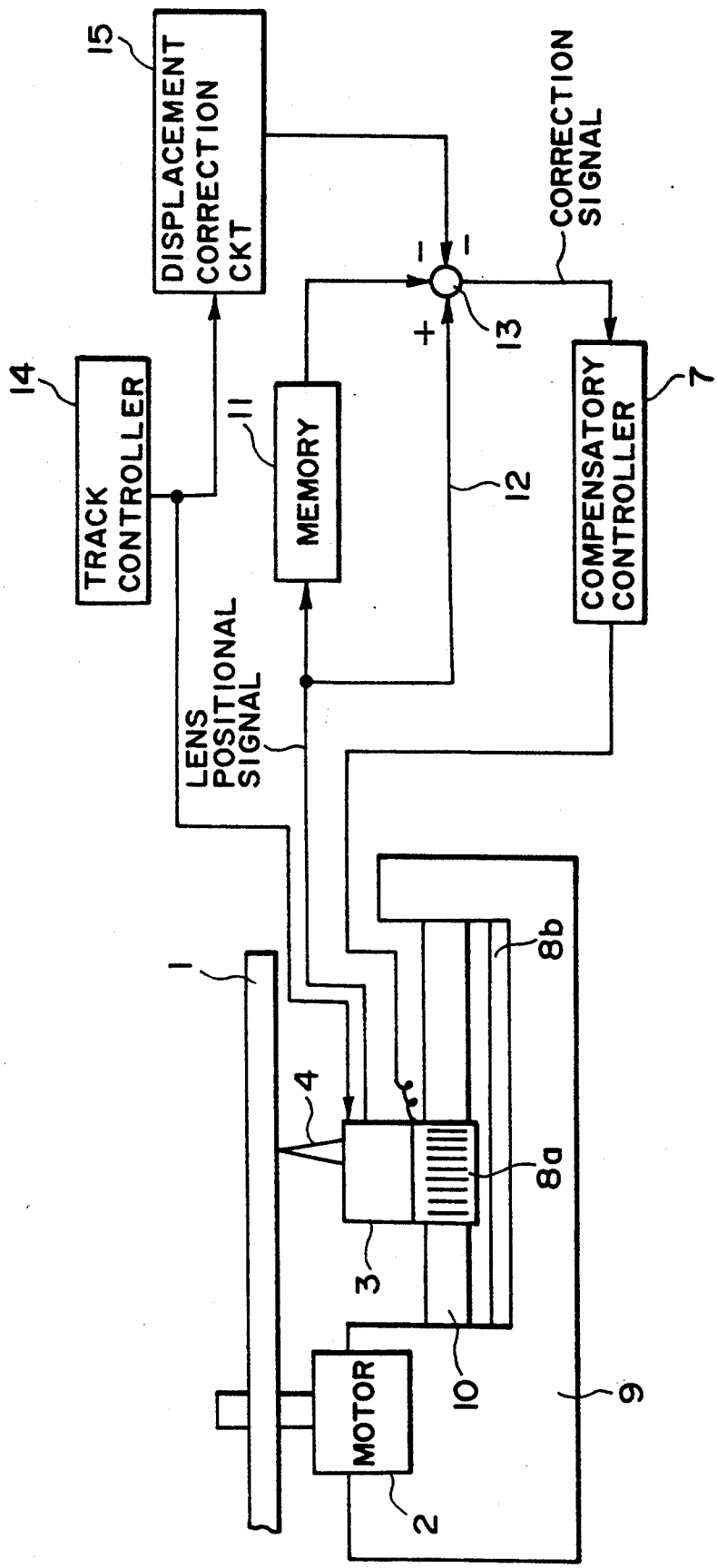
FIG. 6 is a schematic diagram showing another embodiment of the present invention.

FIG. 6 is a schematic diagram showing another embodiment of the present invention.

The reference numeral 14 designates a track controller which is connected to a tracking mechanism and effects the control of track jump in the case of movement of several tens of tracks during tracking servo or track access.

The reference numeral 15 denotes a displacement correction circuit which receives the signal from the track controller 14 as an input, and outputs a signal imitating the movement of the objective lens conforming to that signal.

With respect to the remaining elements, the embodiment of FIG. 6 is similar to the embodiment of FIG. 4.

In the present embodiment constructed as described above, when the applied position of the light beam is to be accessed to a track spaced apart by several tens of tracks from the track at the current position, the signal of FIG. 7 is applied from the track controller to a tracking actuator (light beam displacing means), not shown.

By this signal being applied to the tracking mechanism, the position of the objective lens 5 is moved as shown in FIG. 8.

The displacement correction circuit 15 receives as an input the same signal as the signal of FIG. 7 from the track controller 14, and outputs an imitation lens positional signal imitating the signal of FIG. 8, by a secondary integrator or a microcomputer.

This imitation lens positional signal is combined with the real time lens positional signal 12 of the objective lens 5 and the signal output from the memory 11, at the point 13. The combined signal (correction signal) is input to the linear motor coil 8a through the compensatory controller 7, and the objective lens 5 is driven in accordance with this signal.

Accordingly, even during track jump, no unnecessary driving force attributable to the jumping movement is applied to the linear motor and thus, power consumption can be suppressed and stable track jump can be accomplished.

The present invention permits various modifications and applications besides the above-described embodiments. For example, as the light beam displacing means, a galvanometer (such as a so-called tracking mirror) may be used instead of the aforedescribed tracking actuator. Also, as the drive means for the optical head, use may also be made of a combination of a feed screw and a stepping motor.

The present invention covers all such modifications and applications without departing from the scope thereof as defined in the appended claims.

What is claimed is:

1. An apparatus in which a recording medium on which tracks are concentrically or spirally formed is rotated and the tracks are scanned by a light beam to thereby accomplish at least one of recording and reproducing of information, said apparatus comprising:

an optical system for applying the light beam to the medium;

a first actuator for driving at least a portion of said optical system to move the light beam in a direction across the tracks;

a first detector for detecting a positional deviation between the light beam and the tracks and for producing a detection output;

a first control circuit for controlling said first actuator in accordance with the detection output produced by said first detector;

an optical head for carrying said optical system and said first actuator thereon;

a second actuator for moving said optical head in a direction across the tracks;

a second detector for producing a detection output which indicates a relative position of the portion of said optical system moved by said first actuator with respect to said optical head, and which includes an eccentric component caused by the rotation of the recording medium; and a second control circuit for controlling said second actuator in accordance with a signal in which the eccentric component has been eliminated from the output of said second detector, wherein said second control circuit comprises a memory for storing the eccentric component of the output of said second detector as a signal, a circuit for differencing the output of said second detector and the signal stored in said memory to produce a differenced signal, and a circuit for inputting the differenced signal to said second actuator.

2. An apparatus according to claim 1, wherein said second actuator comprises a linear motor.

3. An apparatus according to claim 1, further comprising a circuit for inputting to said first actuator a signal for moving by track jump the light beam from a track currently being scanned to another track, and a circuit for calculating an imitation signal output from said second detector during the track jump, and wherein said second control circuit effects a difference calculation between the imitation signal and the output of said second detector to produce the signal in which the eccentric component has been eliminated.

4. An apparatus according to claim 1, wherein said optical system comprises an objective lens for condensing the light beam on the medium, and said first actuator moves said objective lens in a direction which is perpendicular to the optical axis of said objective lens and which crosses the tracks.

5. An apparatus according to claim 1, wherein said first detector effects the detection of the positional deviation from light of the light beam reflected by the medium.

6. A method of effecting at least one of recording of information on and reproducing of information from a recording medium by use of an apparatus which includes an optical system for applying a light beam to the recording medium on which tracks are concentrically or spirally formed, a first actuator for driving a portion of the optical system to move the light beam in a direction across the tracks, an optical head for carrying the optical system and the first actuator, and a second actuator for moving the optical head in the direction across the tracks, said method comprising the steps of:

rotating the recording medium;

applying the light beam to a track on the recording medium by the optical system;

detecting a tracking error signal indicative of positional deviation between the light beam and the track;

controlling the first actuator in accordance with the detected tracking error signal;

detecting a positional signal indicative of relative position of the moved portion of the optical system with respect to the optical head, the positional signal including an eccentric component caused by the rotation of the recording medium;

eliminating the eccentric component of the rotation of the recording medium from the detected positional signal; and controlling the second actuator in accordance with a signal in which the eccentric component has been eliminated.

7. A method of effecting at least one of recording of information and reproducing of information from a recording medium by use of an apparatus which includes an optical system for applying a light beam to the recording medium on which tracks are concentrically or spirally formed, a first actuator for driving a portion of the optical system to move the light beam in a direction across the tracks, an optical head for carrying the optical system and the first actuator, a second actuator for moving the optical head in the direction across the tracks, and memory for memorizing a signal, said method comprising the steps of:

rotating the recording medium;

applying the light beam to a track on the recording medium by the optical system;

detecting a tracking error signal indicative of positional deviation between the light beam and the track;

controlling the first actuator in accordance with the detected tracking error signal;

detecting a positional signal indicative of relative position of the moved portion of the optical system with respect to the optical head, the positional signal including an eccentric component caused by rotation of the recording medium;

extracting the eccentric component of the rotation of the recording medium from the detected positional signal;

memorizing the extracted eccentric component in the memory;

differencing the extracted eccentric component memorized in the memory from the detected positional signal to produce a differenced signal; and controlling the second actuator in accordance with the differenced signal.

* * * * *

UNITED STATES PATENT AND TRADEMARK OFFICE
CERTIFICATE OF CORRECTION

PATENT NO. : 5,260,923
DATED : November 9, 1993
INVENTOR(S) : HISATOSHI BABA

It is certified that error appears in the above-indentified patent and that said Letters Patent is hereby corrected as shown below:

COLUMN 1:

Lines 11 through 14 should be deleted;
    Line 50, "put" should read --input--;
    Line 54, "racking" should read --tracking--; and
    Line 61, "Also, the" should read --Also, when the--.

COLUMN 3:

Line 2, "apparatus." should read --apparatus according to the prior art.--;
    Line 20, "similar" should read --similarly--; and
    Line 46, "comprises" should read --is--, and "which is" should read --which comprises--.

COLUMN 6:

Line 35, "information and" should read --information on and--.

Signed and Sealed this

Twenty-first Day of June, 1994

Attest:

BRUCE LEHMAN

*Attesting Officer*  *Commissioner of Patents and Trademarks*